(12) United States Patent
Mulder (10) Patent No.: US 8,425,434 B2
(45) Date of Patent: Apr. 23, 2013

(54) METHOD AND APPARATUS FOR MONITORING ANIMAL CONDITION

(75) Inventor: Ron Mulder, Te Aroha (NZ)

(73) Assignee: DeLaval Holding AB, Tumba (SE)

( * ) Notice: Subject to any disclaimer, the term of this patent is extended or adjusted under 35 U.S.C. 154(b) by 300 days.

(21) Appl. No.: 13/056,342

(22) PCT Filed: Jul. 27, 2009

(86) PCT No.: PCT/EP2009/005418
§ 371 (c)(1),
(2), (4) Date: Jan. 28, 2011

(87) PCT Pub. No.: WO2010/012433
PCT Pub. Date: Feb. 4, 2010

(65) Prior Publication Data
US 2011/0125062 A1  May 26, 2011

(30) Foreign Application Priority Data
Jul. 28, 2008  (GB) .................................. 0813778.8

(51) Int. Cl.
*A61B 5/103* (2006.01)
*A61B 1/00* (2006.01)
*A01K 1/10* (2006.01)

(52) U.S. Cl.
USPC ........................... 600/587; 33/511; 119/51.01

(58) Field of Classification Search .................. 600/587; 33/511, 512; 119/51.01
See application file for complete search history.

(56) References Cited

U.S. PATENT DOCUMENTS

| 4,029,415 | A | * | 6/1977 | Johnson | 356/4.08 |
| 4,120,403 | A | * | 10/1978 | Stephanos | 209/564 |
| 4,336,855 | A | * | 6/1982 | Chen | 177/245 |
| 4,406,544 | A | * | 9/1983 | Takada et al. | 356/612 |
| 4,518,052 | A | * | 5/1985 | Chen | 177/245 |
| 4,693,598 | A | * | 9/1987 | Sehr | 356/4.08 |

(Continued)

FOREIGN PATENT DOCUMENTS

| AU | 727101 | 11/2000 |
| DE | 20 2004 020386 U1 | 10/2005 |

(Continued)

OTHER PUBLICATIONS

Riley et al. "Gentic parameters for body weight, hip height, and the ration of weight to hip height from random regression analysis of Brahman feedlot cattle," Journal Animal Science 2007. 85:42-52.*

(Continued)

*Primary Examiner* — Sean P Dougherty
*Assistant Examiner* — Michael C Stout
(74) *Attorney, Agent, or Firm* — Young & Thompson (57) ABSTRACT

A method and system for monitoring the condition of animals provides for current height and weight measurements taken from an animal in order to automatically derive a height-to-weight ratio. The height-to-weight ratio thus obtained may be used to determine whether or not an animal's overall physical condition lies inside tolerance limits in relation to its predetermined expected development. An apparatus for implementing the method of the invention may include a control system configured to determine the height-to-weight ratio and may within a control system of an animal installation. The supply of feed to an animal may be adjusted in response to a deviation of its measured height weight ratio from a target or benchmark value.

19 Claims, 6 Drawing Sheets

U.S. PATENT DOCUMENTS

| | | | |
|---|---|---|---|
| 4,745,472 A | | 5/1988 | Hayes |
| 4,820,041 A * | | 4/1989 | Davidson et al. ............. 356/3.12 |
| 5,189,484 A * | | 2/1993 | Koschmann et al. .......... 356/138 |
| 5,850,290 A * | | 12/1998 | Horiguchi et al. ............. 356/602 |
| 6,781,704 B2 * | | 8/2004 | Dudkiewicz et al. .......... 356/603 |
| 7,039,220 B2 * | | 5/2006 | Kriesel .......................... 382/110 |
| 7,075,537 B2 * | | 7/2006 | Simond et al. ............. 345/440.2 |
| 7,200,952 B2 * | | 4/2007 | Montagnino .................... 33/832 |
| 7,541,547 B2 * | | 6/2009 | McGuire et al. ........... 177/25.13 |
| 7,594,896 B2 * | | 9/2009 | Sakai et al. .................... 600/587 |
| 8,109,008 B1 * | | 2/2012 | Niemczak et al. .............. 33/832 |
| 8,245,664 B2 * | | 8/2012 | Mulder et al. ............... 119/51.01 |
| 2002/0052697 A1 * | | 5/2002 | Serita .............................. 702/30 |
| 2002/0152964 A1 * | | 10/2002 | van der Lely et al. ...... 119/51.02 |
| 2002/0152966 A1 * | | 10/2002 | Lely et al. ..................... 119/57.4 |
| 2002/0152967 A1 * | | 10/2002 | van der Lely et al. .......... 119/61 |
| 2004/0032974 A1 * | | 2/2004 | Kriesel .......................... 382/110 |
| 2004/0075847 A1 * | | 4/2004 | McCracken ................... 356/622 |
| 2004/0199089 A1 * | | 10/2004 | Tasch et al. .................... 600/587 |
| 2005/0155246 A1 * | | 7/2005 | Montagnino .................... 33/832 |
| 2005/0164839 A1 * | | 7/2005 | Watterson et al. .............. 482/54 |
| 2005/0257748 A1 * | | 11/2005 | Kriesel et al. ............... 119/51.02 |
| 2006/0049352 A1 * | | 3/2006 | Irani ......................... 250/339.02 |
| 2006/0132317 A1 * | | 6/2006 | Letkomiller et al. ....... 340/573.1 |
| 2006/0201432 A1 * | | 9/2006 | Pratt ........................... 119/51.02 |
| 2006/0217630 A1 * | | 9/2006 | Ueda et al. ..................... 600/547 |
| 2007/0017111 A1 * | | 1/2007 | Hoback et al. .................. 33/771 |
| 2007/0022967 A1 * | | 2/2007 | Doyle, II ....................... 119/416 |
| 2007/0026493 A1 * | | 2/2007 | Paszek et al. ................. 435/69.1 |
| 2007/0106125 A1 * | | 5/2007 | Yang et al. ..................... 600/300 |
| 2007/0198301 A1 * | | 8/2007 | Ayers et al. ........................ 705/3 |
| 2007/0282629 A1 * | | 12/2007 | Plambeck .......................... 705/2 |
| 2008/0234995 A1 * | | 9/2008 | Newcomb et al. ............... 703/11 |
| 2009/0058730 A1 * | | 3/2009 | Geissler et al. ................ 342/450 |
| 2011/0148639 A1 * | | 6/2011 | Geissler et al. ............. 340/573.1 |
| 2011/0161125 A1 * | | 6/2011 | Pratt ............................ 705/7.11 |

FOREIGN PATENT DOCUMENTS

| | | |
|---|---|---|
| EP | 1 250 837 A2 | 10/2002 |
| EP | 1953508 A1 | 8/2008 |
| EP | 2014230 A1 * | 1/2009 |
| JP | 2001-045903 A | 2/2001 |
| WO | 99/67631 A1 | 12/1999 |
| WO | WO 9967631 A1 * | 12/1999 |

OTHER PUBLICATIONS

Gilbert et al. "Linear Body Measurements of Cattle Before and After 20 Yeasr of Selection for post-weaning Gain When Fed Two Different Diets," Journal of Animal Science, 1993, 71:1712-1720.*

International Search Report, dated Nov. 6, 2009, from corresponding PCT application.

UK Search Report, dated Nov. 28, 2008, in Application No. GB 0813778.8.

* cited by examiner

METHOD AND APPARATUS FOR MONITORING ANIMAL CONDITION

The present invention relates to a method and apparatus for monitoring animals, and in particular, for monitoring the physical condition of animals. The invention may be of use in any installation in which animals are kept commercially, such as an installation for rearing animals such as young calves, heifers or cattle or a dairy installation for cows.

When animals are kept commercially, there is a need to ensure that they are healthy and that their development is progressing in accordance with expectations and norms. It is necessary to determine when an animal is in poor condition in order to take action such as adapting its diet or some other aspect of the conditions in which it is kept. It is known to evaluate animals' overall physical condition using body condition scoring, according to which a Body Condition Score (BCS) is attributed to an animal on the basis of a manual evaluation of the animal by a farmer or any designated keeper of animals. In many cases, a score between one and nine or between one and five may be given as the result of a subjective evaluation of the animal's condition. The use of BCS evaluation is widespread and can provide reliable results. Nevertheless, there can be discrepancies between one evaluator's objective grading and the grading given by a different evaluator. In other words, the BCS system may not be consistent as between different farmers or animal keepers. Moreover, a manual BCS system utilises considerable time by personnel and requires considerable expertise. It is therefore relatively expensive. This in turn can prohibit a regular monitoring from being carried out purely having regard to cost considerations.

In U.S. patent application 2007/022967 there is disclosed a system and method for measuring animals using an array of sensors for detecting dimensions of the body of an animal. The measurements may be used for the determination of progressive differences between successive measurements of an animal in order to monitor the development of the animal. In addition, the measurements may be interpreted by an operator, in order to attribute a BCS to an animal.

The apparatus of U.S. 2007/022967 is relatively complex and does not in itself provide a BCS. Moreover, the device takes into account only those dimensions of an animal which are identified. Therefore, any attempt to attribute a BCS to an animal which is measured in accordance with the system and method of U.S. 2007/022967 will remain subjective and requires to be carried out manually by a user making an interpretation of the dimensional measurements which are obtained.

An apparatus for measuring height and weight of an identified livestock animal is disclosed in JP patent application publication number 2001-045903. Whilst the apparatus disclosed therein may be used for monitoring animals, it provides no discussion as to body condition scoring or the use of a parameter describing the overall condition of an animal. WO 99/67631 discloses the use of a determination of total body fat for evaluating an animal's suitability for a feeding program or for slaughter. A variety of physical measurements may be performed on an animal in order to estimate its total body fat. According to AU 727101, the optimal finishing weight of an animal in a feeding programme may be determined in order to estimate the animal's remaining time in the program. One way of determining optimal finishing weight utilises a frame score which can be derived using a formula based upon physical measurements of an animal.

It would be desirable to provide a method and apparatus for automatically determining a body condition of an animal. It would furthermore be desirable to provide such an apparatus and method at a lowest possible cost.

The method of the invention and the apparatus for carrying out the method addresses these drawbacks and provides additional benefits which will become apparent from the following specification.

The method according to the invention is defined in appended claim 1. Further optional aspects thereof are defined in subclaims 2-11. An apparatus for carrying out the method of the invention is defined in subclaim 12. Further optional aspects thereof are defined in subclaim 13.

The use of height and weight measurements enables an animal's condition to be determined easily and at a low cost. A lower cost apparatus and method will enable a high take-up rate among animal installations and thereby lead to greater efficiencies.

According to the invention, the condition of an animal may be defined in terms of the ratio of the animal's measured height to its measured body weight. In this context, an animal's condition can be understood to be its physical condition, most particularly, it may be an indication of the growth and development of the animal. A height of an animal may be measured in any suitable manner, which may include automatic height detection using a simple array of sensors appropriately located in an animal installation for making regular measurements on identified animals. A height may be the height measured at any suitable location on the animal, and in particular at a location for which a height measurement is easily made or automated. Any location along the back of an animal may therefore be suitable, and in particular the hips or withers of an animal. In many instances, the hip height of an animal may be preferred because it offers a potentially more consistent reference point than the withers, whose position may be altered by movement of an animal's head and neck.

The present invention provides an automated alternative to the practice of body condition scoring. It furthermore enables an enhanced parameter for an animal's condition to be automatically obtained, which parameter takes account of more than mere dimensions of an animal. The solution according to the present invention provides both these advantages within the framework of a simple method and apparatus which can therefore be provided and used at very low cost. This lower cost apparatus and method will enable a high take-up rate among animal installations and thereby lead to greater efficiencies. Moreover, since the low cost apparatus and method of the invention allow easy determination of a condition of an animal, there may be additional incentives to adopt the method and apparatus to an enhanced degree and thereby to enable more frequent monitoring of animals than would be possible with a manual or more prolonged method and costly, sophisticated and delicate apparatus.

A control system suitable for use in the method of the invention may be a stand alone device for animal monitoring or it may form a part of a control system of an animal installation such as a feeding or milking installation for livestock such as cattle or dairy animals. A suitable control system comprises at least one processor and at least one memory. A processor may be any suitable arithmetic unit in the art of computing or control. A memory may be provided in the form of any suitable registers for temporary storage of information or data storage for longer term information storage. Memory in the form of data storage or registers or any other types of memory may comprise data files containing information relating to individual animals.

The condition of an animal may be automatically determined in particular by the use of a processor operating on information contained in a memory of the control system. The determination may be made on the basis of measured and/or stored values by a calculation carried out using those values.

According to the present invention, information pertaining to a recently measured height and/or a recently measured weight of an identified animal may be obtained by the control system via one or more measuring devices which are used on the animal. Alternatively, or in addition, a height and/or weight value may be input into the control system by transmission from an external source or they may be input by a user. In some cases, a control system may be associated with either one or more height measuring devices or with one or more weighing devices or with both. Therefore, values may be fed to the control system from a measurement device and/or transmitted or input into the control system by other means.

Current values pertaining to height or weight of an animal are intended to be the most recently obtained values for the respective parameters, provided that those values are not determined to represent an erroneous measurement. In general, values which are used should be obtained reasonably concurrently. That is to say, if the age of an animal is measured and recorded in hours, then measurements of height and weight should be values from measurements obtained within a same hour. When the age of an animal is measured and recorded in days, then the respective measurements should have been obtained on a same day. The same rationale may be applied in the same way where an animal's age is measured in weeks or in months, although it is preferably even in such cases, for respective measurements to have been obtained on a same day, and for successive measurements to be obtained on the corresponding day of successive weeks or months. It is immaterial whether height is measured in millimeters, centimeters, meters or feet or inches, provided the measurement units are constant in successive measurements. Similarly, weight may appropriately be measured in kilograms or pounds, provided the same units are always used and provided also, that the units are compatible with the control system. Units of measurement should also be consistent with the units which are used to derive an expected height-to-weight ratio curve against which comparisons are to be made.

In the present context, animals which are subject to the monitoring method of the invention are identified within the system by any appropriate means. In many installations, for example, animals are automatically identified by a control system at various locations in the installation, by means of identification receivers and a transponder worn by each animal. Measured values may thereby be placed in appropriate memory data files for the corresponding animal. If needed, measured values may be stored in an appropriate data file for the relevant animal together with the date and in some cases also the time when the measurement was made.

For the purposes of the present invention, a comparison between an obtained value and a predetermined expected value may be carried out by subtracting the expected value from the obtained value. A negative result would indicate that the obtained value is lower than the expected value, while a positive result would indicate an obtained value which is greater than the expected value. Any other suitable method for calculating a comparison between two values may be employed, such as for example the use of statistical methods.

Figure 3:
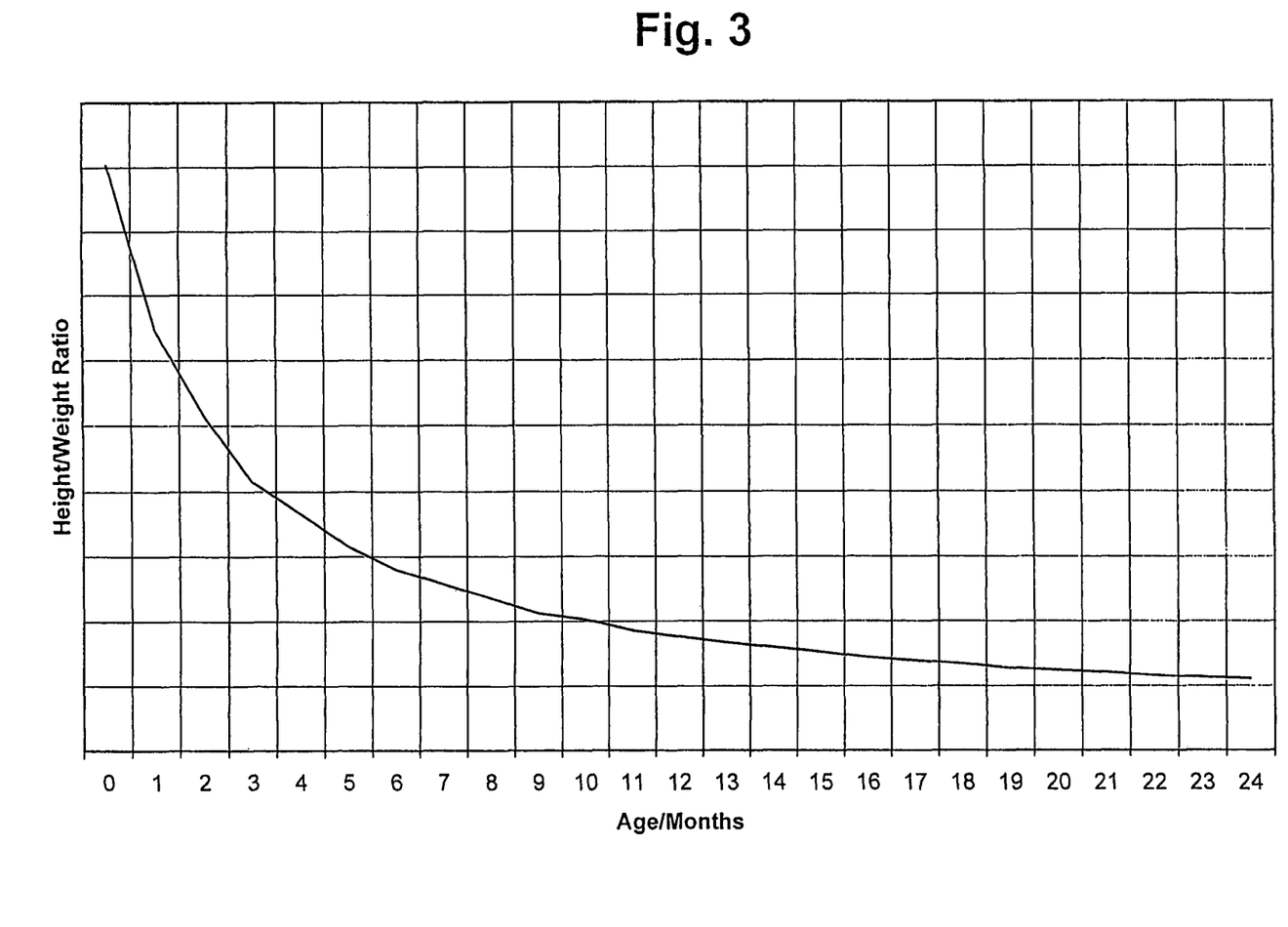

During the growth phase of an animal, its height-to-weight ratio value is in evolution, so that the absolute value of a growing animal's height-to-weight ratio may be of interest mainly in relation to its age and in relation to an expected value for height-to-weight at the corresponding age. A predetermined expected value for height-to-weight ratio of a growing animal may in particular be obtained from a function describing the expected height-to-weight ratio of an animal through time during its growth phase. An example of such a function is illustrated in FIG. 3, which represents a growth phase of a calf during the first two years of its life. The function may appropriately be referred to as a height-to-weight ratio curve.

The curve may indicate values of the height-to-weight ratio of a group of animals or of an individual animal at each successive age of the animal during growth, whether measured in hours, days, weeks or months. After an animal is fully grown, a determined height-to-weight ratio may be compared with an absolute expected value for the fully grown animal, or it may continue to be compared with expected values at successive ages of the animal. In some aspects, there may be stored successive expected height-to-weight ratio values for fully grown animals only in respect of the nearest month of age for comparison purposes, whereas it may be advantageous to measure and store height-to-weight ratios of growing animals against stored successive expected values in respect of animals' age in days or weeks. In certain cases, also expected value data in respect of growing animals may be held only in respect of successive months of age.

According to an aspect of the invention, when a comparison is to be made between a determined height-to-weight ratio and a predetermined expected height-to-weight ratio, the predetermined height-to-weight ratio stored in a memory which is to be used for making the comparison, is that value which corresponds to same age as the animal for which the determination is being made. Therefore, it may advantageously be provided that values for a height-to-weight ratio parameter may be stored in memory along with the age of the individual animal being measured or, in the case of stored expected values, along with the age of animal to which the expected value corresponds.

In aspects of the invention, when a comparison has been made between a determined height-to-weight value and an expected value, the result of the comparison may be indicated. A suitable indication may be given by means of a display such as a display screen or by means of a printout or by any other suitable means. In some aspects, an alarm may be sounded or an alarm signal may be emitted in case, as a result of the comparison, it is determined that the determined height-to-weight ratio value lies outside a tolerance range or extended tolerance range or in case a value obtained is deemed to be an error. A tolerance range may be established and input into the control system at an appropriate memory location. The tolerance range may represent a range of values which deviate from an expected value to an extent considered acceptable, that is to say, a deviation within a tolerance range may be considered not to require any action to be taken in relation to the animal concerned. Deviations which lie outside a tolerance range may or may not require action to be taken, depending on the extent of the deviation and possibly depending on whether or not a previously determined height-to-weight ratio value lies outside a tolerance range. In some aspects, a tolerance range may be stored as well as a further tolerance range, which may be a critical tolerance range. Where a determined value lies outside a critical tolerance range, an indication or alarm may be given immediately, i.e. without delay, in order that appropriate action may be taken. Action may include making a further determination of the height-to-weight ratio of the animal, in order to ensure that no error was involved, or it may involve taking action in relation to the conditions under which the animal is kept, in particular in relation to diet or medication.

Accordingly, in an aspect of the present invention, when the result of a comparison indicates that a determined value lies outside a tolerance range, a corresponding indication may be given by the control system in any suitable way, such as by means of an alarm signal or by means of a display output. In some aspects, when it is determined that a determined height-to-weight ratio lies outside a tolerance range, then it may further be investigated whether one or more immediately preceding values also exceeded the tolerance range. Thus, in certain aspects of the invention, an alarm signal or display indication may be emitted when a current value and also one or more immediately preceding determined values lie outside the tolerance range.

An error range may also be utilised in aspects of the invention. Accordingly, values which result from the comparison process and which fall outside the error tolerance range may be considered to be inadmissible. An alarm may be sounded or any appropriate indication may be given such that the animal is measured again to determine its height and weight or in order that a check is carried out on the data which is being processed in order to determine any possible error in those values.

In aspects of the invention which utilise a further tolerance range, it may be determined that an alarm signal or display indication is always given when the determined height-to-weight ratio lies outside the further tolerance range.

Tolerance ranges may be established in any suitable way, having regard to the desired condition of animals being monitored. A tolerance range may thereby typically comprise a maximum and a minimum threshold value.

A height-to-weight ratio curve for use in the context of the present invention may be a height-to-weight ratio curve for a relevant breed of animals. The height-to-weight ratio values which are predetermined expected height-to-weight ratio values may be derived from a height-to-weight function curve for the breed in question. A height-to-weight ratio curve for use in the present context may be a representation of height-to-weight of a breed of animals plotted against animal age. In most cases, the resulting function will be represented as a curve. In certain cases, an individual height-to-weight ratio curve may be derived and stored with in the control system in respect of each individual animal in an installation. Comparisons between a height-to-weight ratio which has been determined for a given animal, on the basis of its current height and weight, and in association with the animal's current age, may thereby be made against the individual animal's expected height-to-weight ratio at the corresponding age. When generating an individual height-to-weight ratio for an animal, additional factors may be taken into account, in addition to the breed of the animal. For example, the standard height-to-weight ratio curve for a relevant breed may be adapted in respect of the measured parameters of the animal's known parents or grandparents. In some cases, the known history of the height to weight ratio of the mother or grandmother may be used to apply an individual correction factor to a standard curve. Additional parameters which may be used in order to adapt a standard curve in respect of an individual animal may further include measurements made on the animal at birth or within its first week of life. Thus, height or weight or height-to-weight ratio at birth or during the first week of life may be used to create a given animal's individual curve by adapting a standard curve.

The method of the invention may be utilised in relation to calves, whether pre- or post-weaning, and heifers. The invention may furthermore be practiced on cows after a first or second or third insemination. Since it has been determined that cows may continue to grow even during their third lactation phase, then the method may continue to be useful during the third lactation phases. Since the method is easy to put into practice, it may be appropriate to continue monitoring animals in accordance with the invention throughout the useful life of the animal in order to provide a timely warning of any deviation from a normal condition of an animal.

An apparatus for carrying out the method of the present invention may comprise a control system with a processor and any suitable memory. In the context of the present disclosure and claims, a reference to a memory may be a reference to one or more memory devices. An apparatus for use in carrying out the present invention may suitably comprise a data input and/or output device. Any suitable input device including devices such as a keyboard or touch screen or data connection port may be used. Output devices may include any suitable output device such as a data connection port or screen or printer or any suitable display device. The apparatus according to the invention may, in certain aspects, be a monitoring device in a control system of an animal installation for keeping or rearing animals. Installations in which the present invention may be useful may include, but are not limited to, a dairy installation or an animal rearing installation for young animals such as calves.

In aspects of the present invention, the apparatus of the invention may be associated with animal measurement devices such as a height gauge and/or weighing scales. The control system of the apparatus of the invention may thereby carry out a determination of height and/or weight of an animal and use the results as a basis for calculation by the processor of the control system in order to derive a value of the height-to-weight ratio of the animal. In other aspects of the invention a height and/or a weight measurement may be input into the apparatus by a user or it may be transferred to the control system of the apparatus via a data link to one or more external devices.

In further aspects of the invention, when it is desired to determine the suitability of a young animal for weaning on to dry feed and to cease giving liquid feed, a reference to its progress in relation to an expected height-to-weight ratio may be made in order to provide an improved determination of its readiness to be weaned. In some cases, it is determined that animals are weaned when they reach a certain height and/or when they have reached a certain age. The method and apparatus of the invention may provide an enhanced indication of readiness to wean, whereby an animal is not weaned unless its height-to-weight ratio lies within predetermined tolerance limits of an expected value.

The height-to-weight ratio proposed by the method and apparatus of the present invention can provide an enhanced indicator in relation to BCS also because it can be more accurate than BCS. This can result from its empirical determination of the condition of the animal, as opposed to the more subjective BCS method. In particular, a BCS may take insufficient account of an animal being excessively fat. In other words, an animal, such as for example a cow or heifer, may appear to be in good physical shape when she is in fact carrying fat instead of being lean. The height-to-weight ratio proposed according to the present invention provides a remedy to the intrinsic disadvantage associated with BCS. It supports farmers in their bid to rear animals such as calves which can be weaned as early as possible and which maximise the animal's genetic weight and height potential. Moreover, it enhances a farmer's effectiveness in rearing animals which grow muscle and bone rather than fat.

Moreover, the simplicity of the method and apparatus according to the invention allows an easy and cost-effective implementation within animal installations. The invention also allows a much more frequent determination of the condition of an animal to be made than would be possible using a manual method, especially in cases where weight and height values are obtained automatically using dedicated apparatus. Current animal numbers in cow herds are getting so large that it is almost impossible to do a visual appraisal (BCS) every 2-4 weeks in, say, a 1000 cow herd. The frequency of determinations of the physical condition of an animal can be crucial in influencing the speed with which deviations from a good condition are identified and for allowing a rapid intervention in case a deviation is considered to fall in a range which requires remedial action to be taken. For example, it is far more effective in terms of utilisation of resources, especially feed, to intervene in the growth of an animal by providing additional resources at the earliest possible stage, because a deviation from an ideal condition by a younger animal is cheaper to remedy than a deviation by an older animal. More resources are needed to correct a deviation in an older animal. Therefore, early intervention, made possible by easy and therefore regular monitoring is particularly advantageous.

It has been found that critical periods of an animal's development lie within the age range between week zero and week nine, and more particularly, between week zero and week six. During these times, it can be advantageous to monitor an animal's height to weight ratio weekly or even daily in order to determine whether or not the animal's condition falls inside tolerance limits.

Figure 1:
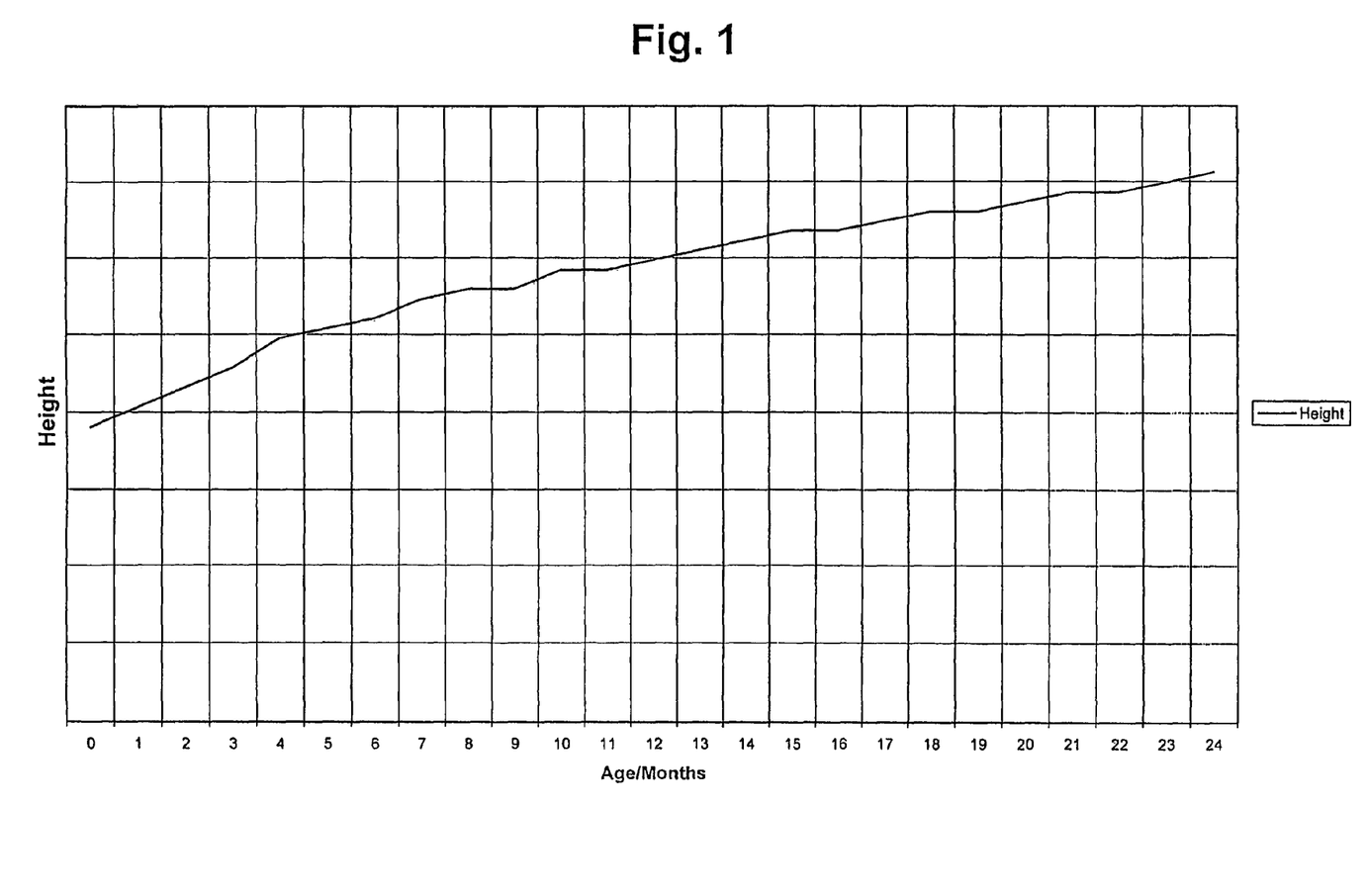
Figure 2:
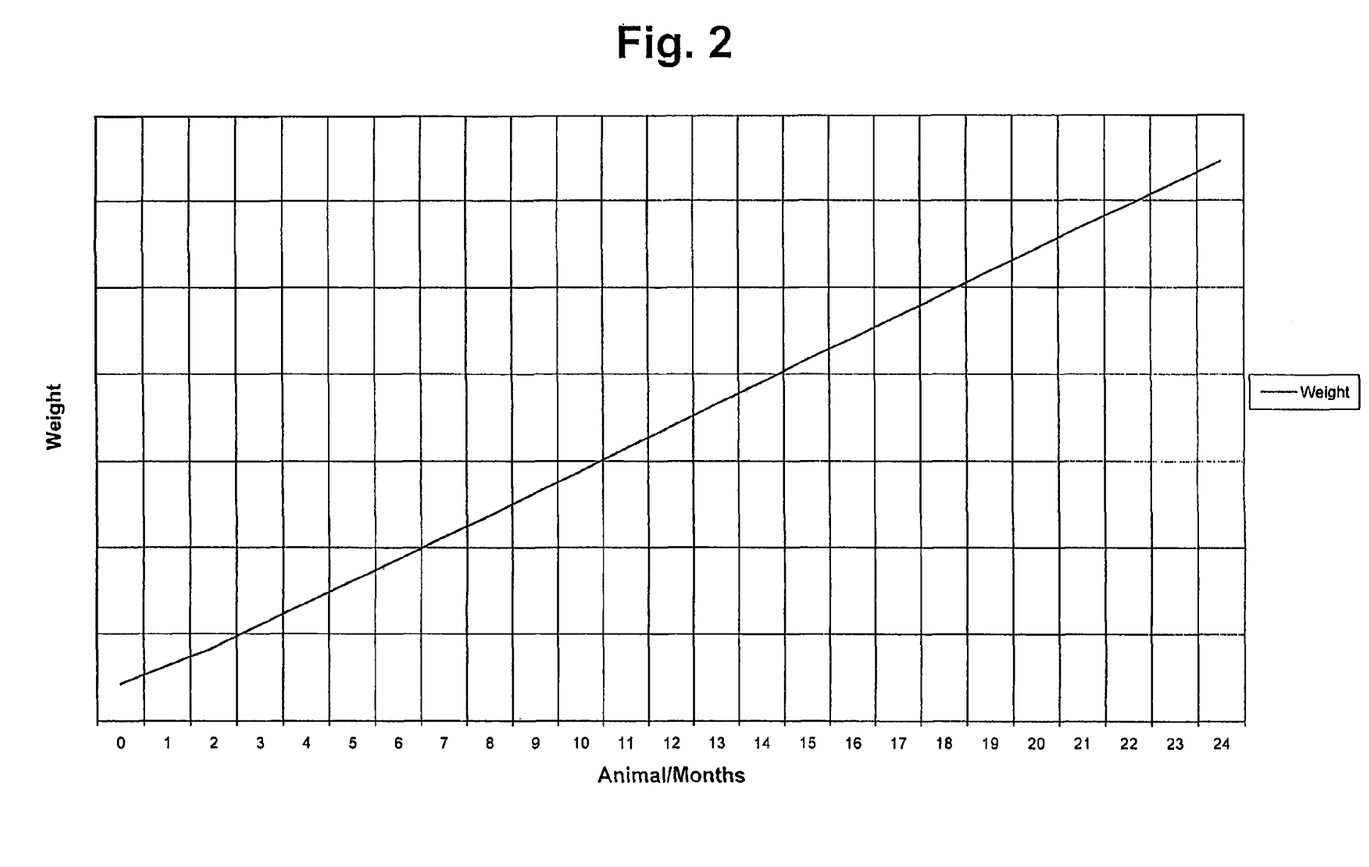

In many instances, it has been found to be possible, and commercially beneficial to a heifer to be brought into calf at 95 percent or more of her mature body weight and height. Using the height-to-weight ratio as per the present invention, an apparatus may readily and reliably determine an optimum time for an animal to calve. In particular, a heifer which lies in a height or weight range above 95 percent of her mature weight may be prevented from being brought into calf in case it is determined that she has a height-to-weight ratio which lies outside a tolerance range. The respective height and weight development graphs illustrated in FIG. 1 and FIG. 2 can be useful for tracking and monitoring an animal's development but they are each too limited when taken alone to provide useful benchmarks for rearing animals. The function shown in FIG. 3, by contrast while remaining comparatively straightforward to derive and to use, can provide a significantly enhanced guide to the development of animals.

Some apparatus capable of carrying out the method of the present invention is illustrated for information and by way of non-limiting example in appended drawings, in which.

Figure 4:
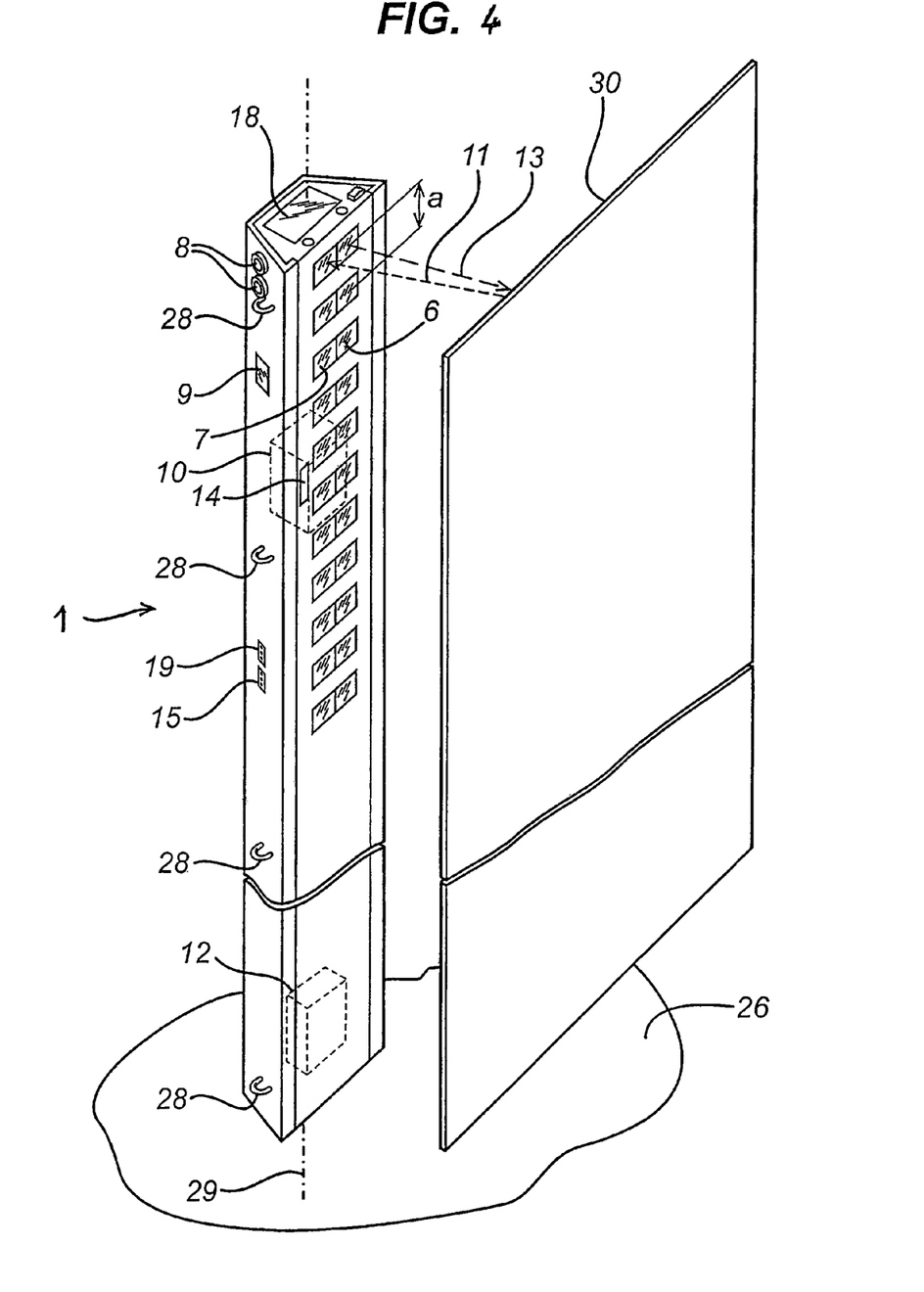
FIG. 4 shows a height gauge and control device for monitoring animals.
Figure 5:
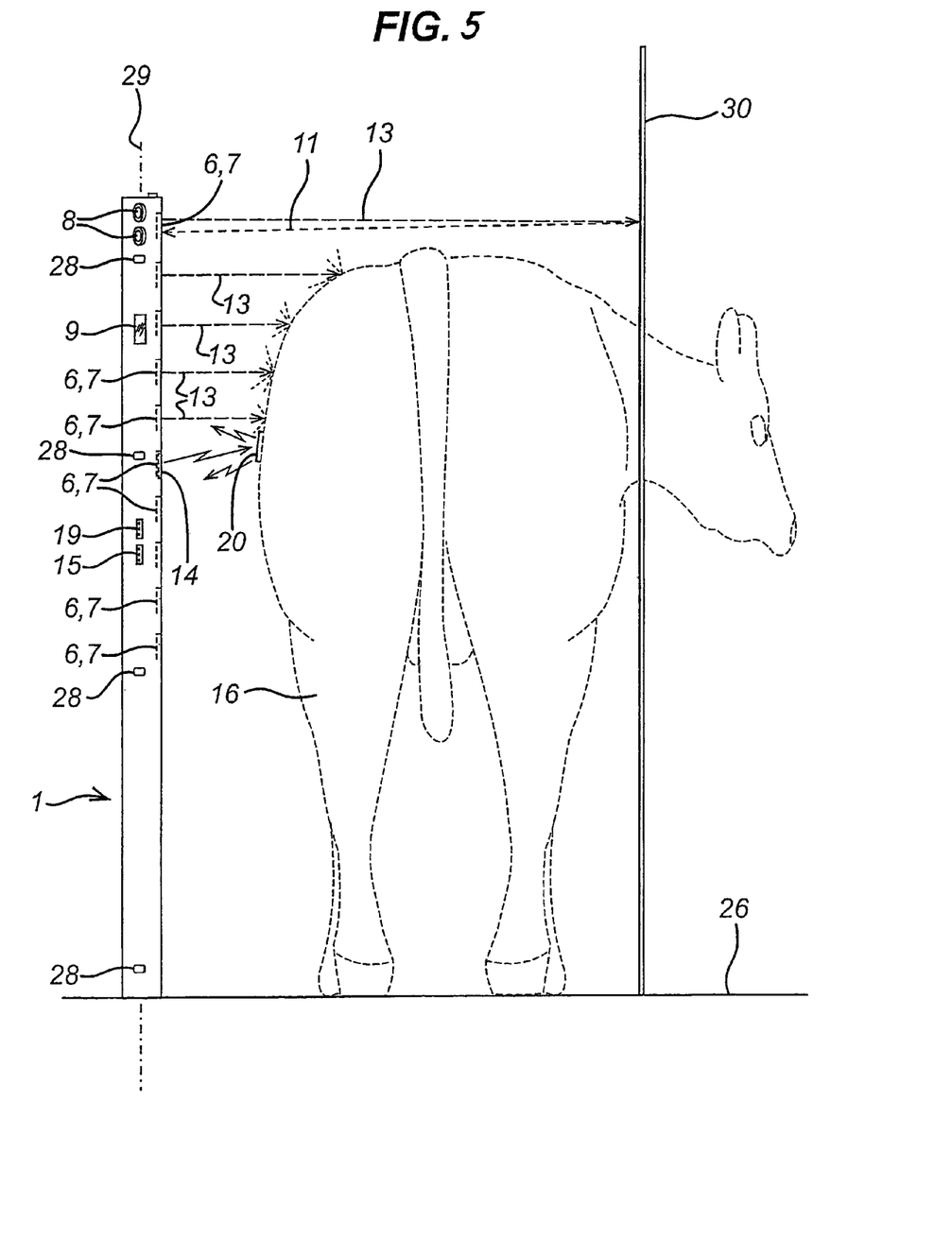
FIG. 5 shows an end view of a height gauge of FIG. 1 in use.

An apparatus for determining a height-to-weight ratio of an animal may be provided in the form of a height gauge 1 shown in FIG. 4 and FIG. 5 as a measuring stick. The stick may be portable (as shown) or it may be fixed by attachments 28 to an animal stall or any suitable part of an animal installation. The height gauge 1 which is shown is capable of measuring a height of an animal 16 located on a level reference surface which may be a floor 26. Measurement may be effected by means of receivers 7 of electromagnetic radiation which may be emitted from an animal, such as infra red radiation, or which may be emitted by an emitter 6 in the height gauge 1. In most cases, receivers and any emitters may be located at intervals a which may be regular intervals along a length direction, or axis 29, of the height gauge 1. Emitted radiation 13 which is reflected 11 from a reflecting surface 30 may be received by one or more receivers 7, while emitted radiation 13 which is incident on an animal 16 may be absorbed or dispersed and may be detected at a low level of intensity by one or more receivers 7 or not at all. In this way, and using algorithms in a memory of a control device 10 of the apparatus, a determination of the height of a nearby animal may be made. In case no reflector panel 30 is used, a determination of the radiation from a nearby animal may be based upon infra-red radiation or visible light received by a series of receivers 7, which receivers may incorporate direction filters allowing only substantially perpendicular radiation incident upon the height gauge 1 at various points along the gauge, to be detected by the receivers 7. In some embodiments the emitted and reflected radiation 13, 11 may be laser radiation. The control device 10, as mentioned may in particular comprise memory and one or more processors. The control device may thereby store animal information of any useful or desired kind and may perform calculations and computations on the basis of the information. Animal files may be kept in memory relating to individual animals which may be identified automatically using any suitable identification device such as a transponder receiver 14 which co-operates with a transponder 20 worn by individual animals 16. In addition to information and measurements gathered by the height gauge 1, and stored in the control device 10, there may be input into the control device, via the height gauge any desired information. To this end, the height gauge 1 may be provided with input and output means in the form of a display 18 which may be a touch screen an/or additional input and output devices in the form of keys 8, input or output ports 15, 19 or remote control communication pot 9 such as an infrared or Bluetooth communication port. In this way the height gauge 1 may communicate using connections or wireless connections with additional or alternative control systems of an animal installation or with ancillary control equipment or physical equipment for performing operations related to animals. When the height gauge 1 is a portable device, it may comprise an autonomous power source 12 located within it, preferably near a lowermost extremity.

Figure 6:
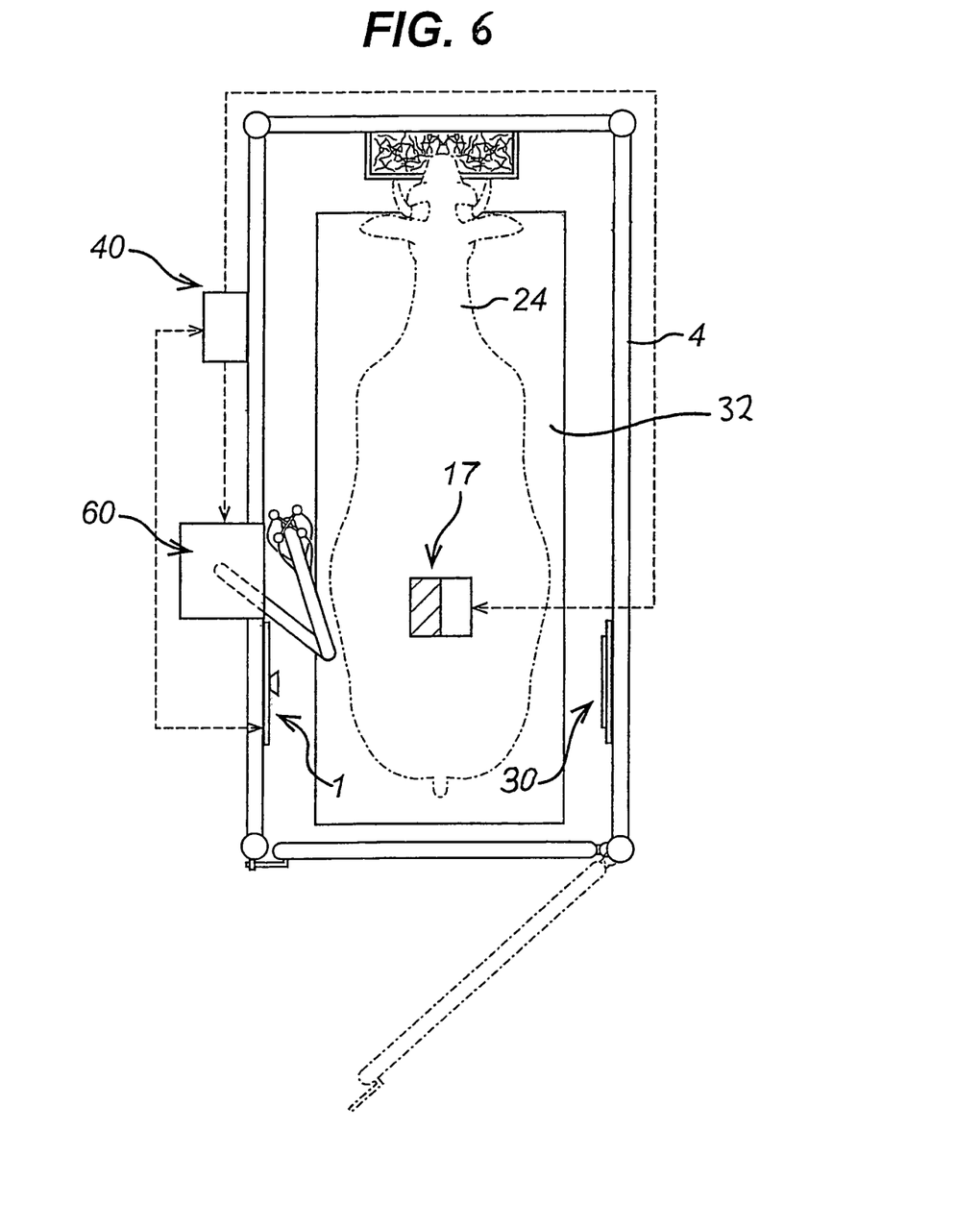
FIG. 6 shows an animal stall which includes a control device and a height measurement device.

Another example of an apparatus capable of carrying out the method of the present invention may take the form illustrated in FIG. 6, in which an animal treatment stall 4 is shown, in this case, a milking stall with a milking robot 60 controlled by a control device 40, which may be a control device for an animal installation or it may be a control device dedicated to the milking stall 4. The treatment stall 4 may comprise means for measuring an animal height, which may be a height gauge 1 fixed in position at the stall 4 or removably fixed in position and possibly co-operating with a reflector 30 if required. Alternatively the means for measuring an animal height may be any suitable means such as an emitter/receiver type measurement device 17 located above the position of an animal 24 in the treatment stall 4. In either case, the height measurement device is connected remotely or via wireless connection means to a control device 40. The emitter/receiver type height measurement device may be an ultrasound device or laser or infra-red or any other suitable device capable of measuring a height of an animal from a position above an animal 24 when it is located in an animal space. In the case illustrated, the animal space is the space within the stall 4. The stall 4 may optionally comprise a weighing device in the form of a scale plate 32. The control device 40 shown in FIG. 6 may comprise one or more processors and memory as well as input or output means for input of data by a user or from other data or control devices and for transmitting data to other devices. The control device 40 is thereby capable of acquiring height and/or weight measurement of an individual identified animal using identification devices for identifying an animal on which measurements are being made. Alternatively a control device may receive height and/or weight data which is input from another connected device or which is input by a user. An automatic determination of a height to weight ratio of an animal may be carried out by the control device 10, 40 and a value obtained may be compared with a value which corresponds to an expected value stored in a memory, in a manner already explained.

By way of example, a weight measurement of a growing calf at two months old may indicate that the calf is on the 25th percentile for weight of a sample distribution (only 25% of calves of the same type or from the same group are this weight at two months of age—i.e. below average). It may well be that the calf in question does not appear to be noticeably underweight. In such a case, a monitoring system based on body condition scoring (BCS) would not identify any irregularity or action to be taken. At the same time however, it may be that a height measurement indicates that the calf is on the 50th percentile for height (i.e. of average height for its age). A height-to-weight ratio value of the calf in question will therefore show the animal to be in need of some action or intervention, when compared with a benchmark value for the calf's sample group.

Therefore, a method or system according to aspects of the invention can act, by feeding the animal with a greater quantity of feed, or by emitting a signal to a feeding system, to adjust the animal's designated feed ration, especially a concentrates ration, by an amount which may be automatically determined in relation to the measured deviation from a benchmark value of the calf at its age and in its particular group. The same methodology may be applied to a heifer or cow. Accordingly, in aspects of the present invention, when it is determined that the momentary height:weight ratio of an individual animal lies outside a tolerance range for that animal or herd or group, then there may additionally be carried out a method step of outputting a signal to an automatic animal feed control system which signal is effective to adjust the amount of feed to be supplied to an individual animal. A feed trough is shown in FIG. 6, which may be a trough for automatically supplying feed to an animal by means of a control system and feed dispensing apparatus.

In some aspects of the method and system according to the invention, the trend value of the measured height-to-weight ratio may be monitored. Accordingly, at birth, the calf may be attributed a rank within its particular group, representing its height-to weight ratio in relation to the other animals in that group. As the animal grows, its rank within the group may change, or it may move to a different percentile within the group height-to-weight ratio distribution. Upon monitoring that animal's height-to-weight ratio, and upon identifying that the animal is drifting away from its initial rank in the group, action may be taken in the form of emitting a signal to supply the animal with a correspondingly adapted level of concentrates.

A benchmark value against which other values are compared may be a herd benchmark value within an installation. Each calf can be ranked according to the herd benchmark value for height-to-weight ratio. This could change from installation to installation based on e.g. animal breed, herd, feeding group, stage of lactation, cow age or according to any particular grouping system being applied at an installation. If a calf (or cow, heifer, etc) trends progressively further away from the average then action may be taken in the form of adapting the animal's feed ration. Alternatively, other practical interventions may be carried out in relation to the animal, such as:

supplying more (or less) milk or milk powder
wean the animal at a later/earlier age
increase/decrease protein feed in the diet
check animal health In the case of animal health, if a cow height:weight ratio is determined to have changed significantly within in a comparatively short period, according to aspects of the method and apparatus of the present invention, an alarm signal may be automatically emitted indicating the deviation and signalling a need to attend to it.

When working with dairy cows, different breeds or genetic lines have different average heights and weights (based on reaching full genetic potential).

This has implications on feeding, cow efficiency and economic performance of the cow. When a cow calves she may have a height to weight ratio of 3 (e.g.: 1500 mm to 500 kg=3). After milking for 4 weeks this may change to 3.33 (1500 mm to 450 kg=3.33). From this, her weight and milk performance can be managed.

Examples of actions to be taken:
If height:weight ratio increases she is getting thin, therefore, feed more.
If height:weight ratio decreases she is getting fat, therefore, feed less.

Additional advantages and uses for the method and apparatus described herein will be apparent to those skilled in the art. In particular, the method may be readily utilised in animal installations by installing suitable equipment or by adapting existing equipment with necessary implementing units. A system for implementing the method described herein may suitably comprise appropriate hardware and software.

The invention claimed is:

1. A method for automatically determining a condition of an animal, the method comprising the steps of:
   moving an animal to be measured adjacent a height gauge, the height gauge configured for measuring a height of the animal located on a level reference surface, the height gauge comprising a control device (10), comprise memory storing an algorithm, and a processor, and animal files relating to individual animals;
   automatically determining a identity of the animal using the height gauge, the height gauge further comprising a transponder receiver (14), by the transponder receiver co-operating with a transponder (20) worn by the animals;
   automatically determining a current height of the animal using the height gauge, the height gauge further comprising five receivers (7) positioned vertically spaced from each other at a regular interval (a) along a length direction axis (29) of the height gauge, the receivers measuring one of a signal emitted from the animal and a reflected signal reflected from at least one of a reflector panel and animal, based on signals received by the receivers and using the algorithm in the memory of the control device, making a determination of the height of the animal;
   automatically storing the determined current height in the control device;
   automatically determining a current weight of the animal and storing the determined current weight in the control device;
   automatically deriving, using the processor, a height-to-weight ratio of the animal from the stored current height and stored current weight;
   automatically storing the derived height-to-weight ratio in the control device;

automatically comparing the derived height-to-weight ratio value with a predetermined expected height-to-weight ratio to obtain a result;
automatically storing the result in the control device; and
automatically using the stored result to determine a condition of the animal, wherein,
in the moving step, the animal is moved between the height gauge and the reflector,
in the determining a current height step, the receivers measure a reflected signal reflected from the reflector panel and plural reflected signals reflected from the animal, and
the method comprises the further step of using the height gauge to emit signals, which are reflected off the reflector panel and off the animal, by plural emitters emitting the signals toward the animal and the reflector panel, the emitters positioned vertically spaced from each other at the regular interval (a) along the length direction axis (29) of the height gauge.

2. The method of claim 1, wherein the emitters emit laser radiation and the receivers measures reflected laser radiation.

3. A method for automatically determining a condition of an animal, the method comprising the steps of:
moving an animal to be measured between a height gauge and a reflector panel, the height gauge configured for measuring a height of the animal located on a level reference surface, the height gauge comprising a control device (10), comprise memory storing an algorithm, and a processor, and animal files relating to individual animals;
determining a identity of the animal using the height gauge, the height gauge further comprising a transponder receiver (14), by the transponder receiver co-operating with a transponder (20) worn by the animals;
emitting signals toward the animal and the reflector panel by using plural emitters incorporated in the height gauge, the plural emitters emitting the signals toward the animal and the reflector panel, the emitters positioned vertically spaced from each other at a regular interval (a) along a length direction axis (29) of the height gauge;
determining a current height of the animal using the height gauge, the height gauge further comprising plural receivers (7) positioned vertically spaced from each other along the length direction axis (29) of the height gauge, the receivers measuring a reflected signal reflected from the reflector panel and plural reflected signals reflected from the animal, based on the reflected signals received by the receivers and using the algorithm in the memory of the control device, making a determination of the height of the animal;
storing the determined current height in the control device;
determining a current weight of the animal and storing the determined current weight in the control device;
deriving, using the processor, a height-to-weight ratio of the animal from the stored current height and stored current weight;
storing the derived height-to-weight ratio in the control device;
comparing the derived height-to-weight ratio value with a predetermined expected height-to-weight ratio to obtain a result;
storing the result in the control device; and
using the stored result to determine a condition of the animal.

4. The method of claim 3, wherein the emitters emit laser radiation and the receivers measures reflected laser radiation.

5. The method of claim 3, wherein,
in the determining a current height step, plural of the receivers measure a signal emitted from the animal, the receivers measuring electromagnetic radiation from the animal.

6. The method of claim 5, wherein,
the receivers incorporate direction filters allowing measuring only substantially perpendicular radiation incident upon the height gauge at various points along the gauge to be detected by the receivers.

7. The method of claim 3, comprising the further steps of:
fixing, by attachments (28), the height gauge to an animal stall;
powering the receivers from an autonomous power source incorporated in the height gauge;
inputting and storing information into the control device by using an input means incorporated in the height gauge; and
reading the obtained result from a display incorporated in the height gauge, wherein,
the animal file stored in the control device comprises the determined height-to-weight ratio, and a record of the age of the animal.

8. The method of claim 7, wherein,
the inputting of information is via one of a touch screen, keys, an input port, and a remote control communication port.

9. The method of claim 3, wherein,
said comparing step is made between the derived height-to-weight ratio and the expected predetermined height-to-weight ratio of the animal at a corresponding age to the age of the animal whose condition is being determined.

10. The method of claim 3, comprising the further step of:
using the height gauge to communicate with a control system of an animal feeding apparatus, the communication with the animal feeding apparatus being based on the determined condition of the animal.

11. The method of claim 3, wherein,
the height gauge is removable installed in an animal stall, and
the determining a current weight step uses a weighing device located in the animal stall.

12. The method of claim 3, wherein the determined condition is whether the derived height-to-weight ratio falls within a predetermined tolerance range of a predetermined expected value of height-to-weight ratio for an animal of the same age as the animal for which a determination is being made.

13. The method of claim 3, further comprising the step of determining that the derived height-to-weight ratio value for the animal falls outside a tolerance range and giving an indication thereof, via an indicator associated with said control device.

14. The method of claim 3, comprising the further steps of:
deriving an expected predetermined height-to-weight ratio for the animal;
storing the derived expected predetermined height-to-weight ratio in the control device;
making subsequent measurements of the animal;
retrieving the stored derived expected predetermined height-to-weight ratio from the control device and making a comparison with he subsequent measurements of the animal.

15. The method of claim 14, wherein said expected predetermined height-to-weight ratio of the animal at any given age is determined on a basis of the animal's breed and adjusted using at least one additional parameter selected from the group consisting of height-to-weight ratio function of the mother, height-to-weight ratio function of a grandmother, height at birth, weight at birth and height-to-weight ratio at birth.

16. The method of claim 3, wherein the animal is a calf pre-weaning.

17. The method of claim 3, wherein the animal is a calf post-weaning.

18. The method of claim 3, comprising the further steps of:
making a determination that a momentary height-to-weight ratio of the animal lies outside a tolerance range for that animal; and
outputting a signal to an automatic animal feed control system, which signal is effective to adjust an amount of feed to be supplied to the animal.

19. A method for automatically determining a condition of an animal, the method comprising the steps of:
moving an animal to be measured adjacent a height gauge, the height gauge configured for measuring a height of the animal located on a level reference surface, the height gauge comprising a control device (10), comprise memory storing an algorithm, and a processor, and animal files relating to individual animals;
automatically determining a identity of the animal using the height gauge, the height gauge further comprising a transponder receiver (14), by the transponder receiver co-operating with a transponder (20) worn by the animals;
automatically determining a current height of the animal using the height gauge, the height gauge further comprising five receivers (7) positioned vertically spaced from each other at a regular interval (a) along a length direction axis (29) of the height gauge, the receivers measuring one of a signal emitted from the animal and a reflected signal reflected from at least one of a reflector panel and animal, based on signals received by the receivers and using the algorithm in the memory of the control device, making a determination of the height of the animal;
automatically storing the determined current height in the control device;
automatically determining a current weight of the animal and storing the determined current weight in the control device;
automatically deriving, using the processor, a height-to-weight ratio of the animal from the stored current height and stored current weight;
automatically storing the derived height-to-weight ratio in the control device;
automatically comparing the derived height-to-weight ratio value with a predetermined expected height-to-weight ratio to obtain a result;
automatically storing the result in the control device;
automatically using the stored result to determine a condition of the animal deriving an expected predetermined height-to-weight ratio for the animal;
storing the derived expected predetermined height-to-weight ratio in the control device;
making subsequent measurements of the animal; and
retrieving the stored derived expected predetermined height-to-weight ratio from the control device and making a comparison with he subsequent measurements of the animal,
wherein said expected predetermined height-to-weight ratio of the animal at any given age is determined on a basis of the animal's breed and adjusted using at least one additional parameter selected from the group consisting of height-to-weight ratio function of the mother, height-to-weight ratio function of a grandmother, height at birth, weight at birth and height-to-weight ratio at birth.

* * * * *